US006861149B2

(12) United States Patent
Pellerite et al.

(10) Patent No.: US 6,861,149 B2
(45) Date of Patent: Mar. 1, 2005

(54) COMPOSITIONS FOR AQUEOUS DELIVERY OF SELF-EMULSIFYING FLUORINATED ALKOXYSILANES

(75) Inventors: Mark J. Pellerite, Woodbury, MN (US); Michael S. Terrazas, Prescott, WI (US); Rudolf J. Dams, Antwerp (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/447,802

(22) Filed: May 29, 2003

(65) Prior Publication Data

US 2003/0207130 A1 Nov. 6, 2003

Related U.S. Application Data

(63) Continuation-in-part of application No. 09/994,561, filed on Nov. 27, 2001, now abandoned.

(51) Int. Cl.$^7$ .............................................. B32B 17/06
(52) U.S. Cl. ...................... 428/428; 428/447; 524/157; 524/236; 524/243; 524/245; 524/306; 524/307; 524/308; 524/309; 524/310; 524/319; 524/366; 524/392; 524/462; 524/837; 528/35; 528/42; 528/421; 528/901; 106/287.16
(58) Field of Search ................................ 524/462, 588, 524/837, 379, 858; 528/35, 42; 428/428, 447

(56) References Cited

U.S. PATENT DOCUMENTS

| | | |
|---|---|---|
| 3,012,006 A | 12/1961 | Holbrook et al. |
| 3,450,738 A | 6/1969 | Blochl |
| 3,646,085 A | 2/1972 | Barlett |
| 3,772,195 A | 11/1973 | Francen |
| 3,787,351 A | 1/1974 | Olson |
| 3,810,874 A | 5/1974 | Mitsch et al. |
| 3,950,588 A | 4/1976 | McDougal |
| 4,090,967 A | 5/1978 | Falk |
| 4,099,574 A | 7/1978 | Cooper et al. |
| 4,242,516 A | 12/1980 | Mueller |
| 4,359,096 A | 11/1982 | Berger |
| 4,383,929 A | 5/1983 | Bertocchio et al. |
| 4,472,286 A | 9/1984 | Falk |
| 4,536,298 A | 8/1985 | Kamei et al. |
| 4,648,904 A | 3/1987 | DePasquale et al. |
| 4,668,406 A | 5/1987 | Chang |
| 4,795,764 A | 1/1989 | Alm et al. |
| 4,983,769 A | 1/1991 | Bertocchio et al. |
| 5,085,786 A | 2/1992 | Alm et al. |
| 5,226,954 A | 7/1993 | Suzuki |
| 5,274,159 A | 12/1993 | Pellerite et al. |
| 5,306,758 A | 4/1994 | Pellerite |
| 5,442,011 A | 8/1995 | Halling |
| 5,550,184 A | 8/1996 | Halling |
| 5,602,225 A | 2/1997 | Montagna et al. |
| 5,702,509 A | 12/1997 | Pellerite et al. |
| 5,851,674 A | 12/1998 | Pellerite et al. |
| 5,980,992 A | 11/1999 | Kistner et al. |
| 6,204,350 B1 | 3/2001 | Liu et al. |
| 6,221,434 B1 | 4/2001 | Visca et al. |
| 6,277,485 B1 | 8/2001 | Invie et al. |
| 6,613,860 B1 * | 9/2003 | Dams et al. .................. 528/36 |
| 2001/0002042 A1 | 5/2001 | Avery |
| 2002/0142097 A1 * | 10/2002 | Giacobbi et al. ........... 427/352 |
| 2002/0192380 A1 | 12/2002 | Elsbernd et al. |

FOREIGN PATENT DOCUMENTS

| | | |
|---|---|---|
| EP | 0 738 771 B1 | 10/1996 |
| WO | WO 97/23432 | 7/1997 |
| WO | WO 98/40439 | 9/1998 |
| WO | WO 99/37720 | 7/1999 |
| WO | WO 01/18135 | 3/2001 |
| WO | WO 01/30873 A1 | 5/2001 |
| WO | WO 01/90267 A2 | 11/2001 |
| WO | WO 02/30848 A1 | 4/2002 |

OTHER PUBLICATIONS

Book Excerpt: Kissa, "Structure of Fluorinated Surfactants," *Fluorinated Surfactants and Repellents,* Second Edition, Marcel Dekker, Inc., (2001), pp. 1–28.
Book Excerpt: Rosen, "Characteristic Features of Surfactants," *Surfactants and Interfacial Phenomena,* John Wiley & Sons, (1989), pp. 1–4.

* cited by examiner

*Primary Examiner*—Margaret G. Moore
*Assistant Examiner*—Marc S. Zimmer

(57) ABSTRACT

The invention relates to compositions used for aqueous delivery of self-emulsifying fluorinated alkoxysilanes to substrates to provide oil and water resistive coatings for the substrates, a method of treating a substrate to render it oil and water repellent, and articles having coatings made from the compositions.

27 Claims, No Drawings

US 6,861,149 B2

COMPOSITIONS FOR AQUEOUS DELIVERY OF SELF-EMULSIFYING FLUORINATED ALKOXYSILANES

CROSS REFERENCE TO RELATED APPLICATIONS

This application is a continuation-in-part of U.S. application Ser. No. 09/994561, filed Nov. 27, 2001 abandoned.

FIELD OF THE INVENTION

This invention relates to aqueous delivery of self-emulsifying fluorinated alkoxysilanes to a substrate. More particularly, the present invention is a dilutable, non-aqueous concentrate comprising at least one self-emulsifying fluorinated alkoxysilane and one or both of at least one organic cosolvent and at least one fluorinated surfactant, which together with water or an aqueous solvent mixture form an aqueous dilution that may be coated and cured on a substrate.

BACKGROUND OF THE INVENTION

Good oil-repellent and water-repellent coatings may be provided to certain substrates by applying to a substrate fluorinated silanes in the molten state or dissolved in volatile organic solvents. The applied fluorinated silanes are cured by heating with a catalyst to chemically affix the fluorinated silanes to the substrates. (See, for example, U.S. Pat. No. 3,012,006 (Holbrook et al.)). However, the use of volatile organic solvents is generally harmful to the environment, and may be hazardous due to the flammability of the solvents. Therefore, an alternative means to apply fluorinated silanes to substrates was developed, which is to use aqueous delivery. (See, for examples, U.S. Pat. No. 5,274,159 (Pellerite et al.), U.S. Pat. No. 5,702,509 (Pellerite et al.), and U.S. Pat. No. 5,550,184 (Halling)).

One problem with known compositions for the aqueous delivery of fluorinated alkoxysilanes to substrates is that they may not have long shelf lives. Another problem is that they may require high-shear mixing before they are coated on a substrate. Known compositions have high solids content, which result in thick coatings.

In particular, U.S. Pat. No. 5,274,159 (Pellerite et al.) describes preparation of fluorinated alkoxysilanes that are self-emulsifying into water. Although they may be self-emulsifying providing good aqueous dispersions, the dispersions do not have relatively long shelf lives upon exposure to water, and they can be difficult to dilute due to their relatively high viscosities.

Although using aqueous delivery of fluorinated silanes, including self-emulsifying fluorinated alkoxysilanes, to substrates is known in the art, there continues to be a desire to provide compositions for aqueous delivery of self-emulsifying fluorinated alkoxysilanes that: 1) can be stored for relatively long periods of time; 2) do not require high-shear mixing or other input of mechanical energy; 3) have relatively low solids content, making them easier to coat thinly on glass and other substrates; and 4) at the same time, once applied to a substrate and cured, can provide durable coatings.

SUMMARY OF THE INVENTION

The present invention provides compositions for the aqueous delivery of self-emulsifying fluorinated alkoxysilanes. One type of composition is a dilutable, non-aqueous concentrate and another type is an aqueous dilution comprising the dilutable, non-aqueous concentrate and a diluting medium that comprises water or an aqueous solvent mixture.

The dilutable, non-aqueous concentrate comprises a non-aqueous, homogeneous mixture comprising:
(a) at least one self-emulsifying fluorinated alkoxysilane of the Formula I:

$$R_f^1\text{-}[\text{-}Q\text{-}[SiY_{3-x}R^1{}_x]_z]_y \quad (I)$$

wherein $R_f^1$ represents a monofunctional or difunctional fluorinated group;
Q independently represents an organic difunctional or trifunctional linking group;
$R^1$ independently represents a $C_1$–$C_4$ alkyl group;
Y independently represents a $C_1$–$C_4$ alkoxy group or a hydrophilic alkoxy group of the structure —O-A-$R^3$ with the proviso that at least one hydrophilic alkoxy group is present in the fluorinated alkoxysilane, wherein each A independently comprises a difunctional hydrophilic group: a) having the formula $(CHR^2\text{—}CH_2O)_q$ in which q is a number having a value of 1 to 40, $R^2$ is independently hydrogen or methyl, and that at least 70% of $R^2$ is hydrogen; or (b) derived from a polyol or its alkyl ether or polyether derivative by removal of one OH and one hydroxyl hydrogen;
and wherein $R^3$ independently is hydrogen or a lower alkyl group having 1 to 4 carbon atoms;
x is 0 or 1;
y is 1 or 2;
z is 1 or 2; and
(b) one or both of at least one organic cosolvent, which is completely miscible in water, and at least one fluorinated surfactant.

The dilutable, non-aqueous concentrate may optionally further comprise at least one additive.

The dilutable, non-aqueous concentrate must be diluted with water or an aqueous solvent mixture before being coated on a substrate. Advantageously, the dilutable, non-aqueous concentrate has a relatively long shelf life that is greater than about 1 day, preferably greater than about 14 days, and most preferably greater than about 6 months under proper storage conditions. The dilutable, non-aqueous concentrate may be shipped and stored more economically than in diluted form. The dilutable, non-aqueous concentrate may be diluted at the location where it is to be coated, which advantageously allows for greater flexibility in choices of the dilution and hence thickness of the coatings being applied. The dilutable, non-aqueous concentrate is dispersed in water or an aqueous solvent mixture (to form the aqueous dilution) simply by shaking by hand a mixture of the dilutable, non-aqueous concentrate and either water or an aqueous solvent mixture. No additional mechanical processing, such as high-shear mixing or ultrasonication, is required.

The aqueous dilution comprises:
a. a diluting medium comprising water or an aqueous solvent mixture, comprising water and at least one organic cosolvent; and
b. a dilutable, non-aqueous concentrate comprising a homogeneous mixture comprising:
i. at least one self-emulsifying fluorinated alkoxysilane of the formula I:

$$R_f^1\text{-}[\text{-}Q\text{-}[SiY_{3-x}R^1{}_x]_z]_y \quad (I)$$

wherein $R_f^1$ represents a monofunctional or difunctional perfluoropolyether comprising perfluorinated repeating units selected from the group consisting of —(C$_n$F$_{2n}$)—, —(C$_n$F$_{2n}$O)—, —(CF(Z))—, —(CF(Z)O)—, —(CF(Z)C$_n$F$_{2n}$O)—, —(C$_n$F$_{2n}$CF(Z)O)—, and combinations thereof, wherein Z is selected from the group consisting of a fluorine atom, a perfluoroalkyl group, an oxygen-substituted perfluoroalkyl group, a perfluoroalkoxy group, and an oxygen-substituted perfluoroalkoxy group, and wherein n is 1 to 6;

Q independently represents an organic difunctional or trifunctional linking group;

$R^1$ independently represents a $C_1$–$C_4$ alkyl group;

Y independently represents a $C_1$–$C_4$ alkoxy group or a hydrophilic alkoxy group of the structure —O-A-$R^3$ with the proviso that at least one hydrophilic alkoxy group is present in the fluorinated alkoxysilane, wherein each A independently comprises a difunctional hydrophilic group: a) having the formula (CHR$^2$—CH$_2$O)$_q$ in which q is a number having a value of 1 to 40, $R^2$ is independently hydrogen or methyl, and that at least 70% of $R^2$ is hydrogen; or (b) derived from a polyol or its alkyl ether or polyether derivative by removal of one OH and one hydroxyl hydrogen;

and wherein $R^3$ independently is hydrogen or a lower alkyl group having 1 to 4 carbon atoms;

x is 0 or 1;

y is 1 or 2;

z is 1 or 2; and ii. one or both of at least one organic cosolvent, which is completely miscible in water, and at least one fluorinated surfactant.

The aqueous dilution may be coated on a substrate to provide a durable coating. Advantageously, the aqueous dilution of the present invention has a relatively low solids content, which makes it easier to coat thinly on glass or other siliceous substrates that may have, for example, optical properties that are sensitive to thickness. The inventive aqueous dilution allows for the elimination of or the substantial reduction in the use of organic solvents in the process that may be flammable and/or harmful to the environment. The aqueous dilution also has a shelf life that is at least several hours under proper storage conditions.

The aqueous dilution has a shelf life that is at least several minutes, preferably at least several hours, and most preferably at least one day. Shelf life of the aqueous dilution can be defined as: 1) the period of time in which the dilution remains stable (i.e. no precipitation of solids); and/or 2) the period of time in which the coating derived from the aqueous dilution provides a comparable level of performance to the performance of a coating desired from a freshly prepared aqueous dilution.

Other embodiments of the present invention include a method of treating a substrate, and an article comprising a substrate and a coating that is formed by coating and curing the aqueous dilution.

DETAILED DESCRIPTION OF THE INVENTION

Dilutable, Non-Aqueous Concentrate

The dilutable, non-aqueous concentrate of the present invention is a homogeneous mixture that comprises: a self-emulsifying fluorinated alkoxysilane having at least one hydrophilic alkoxy group (as described in more detail below); and, one or both of at least one organic cosolvent, which is completely miscible in water, and at least one fluorinated surfactant.

A "homogeneous mixture," when referring to the dilutable, non-aqueous concentrate, is defined as the dilutable, non-aqueous concentrate being stable, i.e., no substantial precipitation or substantial phase separation occurs for at least the time necessary to prepare an aqueous dilution from the dilutable, non-aqueous concentrate, however, preferably, and for the purpose of being commercially practical, the dilutable concentrate is stable for a period of at least about one hour, and preferably up to about six months or longer, under proper storage conditions (closed container, no water, room temperature). The dilutable, non-aqueous concentrate may be clear or somewhat hazy.

By the term "non-aqueous" it is meant that water is not added as a component of the dilutable, non-aqueous concentrate. However, there may be adventitious water in the other components of the composition, but the total amount of water does not adversely affect the shelf life or the stability of the dilutable, non-aqueous concentrate (i.e., preferably less than about 0.1 wt % of the dilutable, non-aqueous concentrate).

Self-Emulsifying Fluorinated Alkoxysilane

By the term "self-emulsifying" it is meant that the fluorinated alkoxysilane can be diluted and stabilized in water, or an aqueous solvent mixture comprising water and at least one organic cosolvent, without an added emulsifier. By "stabilized" it is meant that by shaking a mixture of the self-emulsifying fluorinated alkoxysilane and water, a clear to slightly hazy mixture results that has substantially no solids and remains like that for about minutes. In the presence of an amount of fluorinated surfactant, however, the fluorinated alkoxysilane and water mixture may be "stabilized" for about hours.

The self-emulsifying fluorinated alkoxysilane of the dilutable, non-aqueous concentrate has the formula $$R_f^1\text{-}[\text{-Q-}[SiY_{3-x}R^1_x]_z]_y \qquad (I)$$

wherein $R_f^1$ represents a monofunctional or difunctional fluorinated group, optionally containing one or more ether oxygen atoms, Q independently represents an organic difunctional or trifunctional linking group, $R^1$ independently represents a $C_1$–$C_4$ alkyl group, Y independently represents a $C_1$–$C_4$ alkoxy group or a hydrophilic alkoxy group of the structure —O-A-$R^3$ with the proviso that at least one hydrophilic alkoxy group is present in the fluorinated alkoxysilane, x is 0 or 1, y is 1 or 2, and z is 1 or 2. Each A is independently a difunctional hydrophilic group: a) having the formula (CHR$^2$—CH$_2$O)$_q$ in which q is a number having a value of 1 to 40, preferably 2 to 10, $R^2$ is independently hydrogen or methyl, and that at least 70% of $R^2$ is hydrogen; or (b) derived from a polyol or its alkyl ether or polyether derivative by removal of one OH and one hydroxyl hydrogen, preferably derived from sorbitol or glycerol. $R^3$ independently is hydrogen or a lower alkyl group having 1 to 4 carbon atoms.

Y in Formula I may vary by length and number, but must be sufficiently numerous and/or lengthy to allow the fluorinated alkoxysilane to be self-emulsifying and stabilized in water. The number of Y groups necessary and/or the length of the Y groups that is necessary can be determined using routine experimentation.

The monofunctional or difunctional fluorinated group $R_f^1$ in the above Formula I, representing the fluorinated alkoxysilane, can include linear, branched, and/or cyclic structures, that may be saturated or unsaturated. It is preferably a perfluorinated group (i.e., all C—H bonds are replaced by C—F bonds). However, hydrogen or chlorine may be present as substituents instead of fluorine provided that not more than one atom of either is present for every two carbon atoms, and, preferably, if hydrogen and/or chlorine is present, the $R_f^1$ group terminates in at least one perfluoromethyl group.

In one embodiment $R_f^1$ includes mono- and/or difunctional perfluoropolyethers comprising perfluorinated repeating units selected from the group consisting of $-(C_nF_{2n})-$, $-(C_nF_{2n}O)-$, $-(CF(Z))-$, $-(CF(Z)O)-$, $-(CF(Z)C_nF_{2n}O)-$, $-(C_nF_{2n}CF(Z)O)-$, and combinations thereof. In these repeating units Z is a fluorine atom, a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of perfluoropolyethers containing polymeric moieties made of these repeating units are disclosed in U.S. Pat. No. 6,277,485 (Invie et al.). For the monofunctional perfluoropolyether group, the terminal groups can be $(C_nF_{2n+1})-$, $(C_nF_{2n+1}O)-$ or $(X'C_nF_{2n}O)-$, wherein X' is H, Cl, or Br, for example. Preferably, these terminal groups are perfluorinated. In these repeating units or terminal groups, n is 1 to 6, and preferably 1 to 3.

Preferred approximate average structures for a difunctional perfluoropolyether group include $-CF_2O(CF_2O)_m(C_2F_4O)_pCF_2-$; $-CF(CF_3)(OCF_2CF(CF_3))_mO(C_nF_{2n})O(CF(CF_3)CF_2O)_pCF(CF_3)-$, wherein n ranges from 2 to 4; $-CF_2O(C_2F_4O)_pCF_2-$; and $-(CF_2)_3O(C_4F_8O)_p(CF_2)_3-$; wherein average values for m and p range from 0 to 50, with the proviso that m and p are not simultaneously zero. Of these, particularly preferred approximate average structures are $-CF_2O(CF_2O)_m(C_2F_4O)_pCF_2-$, $-CF_2O(C_2F_4O)_pCF_2-$, and $-CF(CF_3)(OCF_2CF(CF_3))_mO(C_nF_{2n})O(CF(CF_3)CF_2O)_pCF(CF_3)-$, wherein n ranges from 2 to 4, and the average value of m+p is from about 4 to about 20.

Particularly preferred approximate average structures for a monofunctional perfluoropolyether group include $C_3F_7O(CF(CF_3)CF_2O)_pCF(CF_3)-$ and $CF_3O(C_2F_4O)_pCF_2-$ wherein an average value for p is 4 to 50. As synthesized, these compounds typically include a distribution of oligomers and/or polymers, so p and m may be non-integral. The approximate average structure is the approximate average over this distribution.

These distributions may also contain perfluoro chains bearing no functional groups (inert fluids) or more than two terminal groups (branched structures) as a consequence of the methods used in their synthesis. Typically, distributions containing less than about 10% by weight of nonfunctionalized compounds (e.g., those without silane groups) can be used. Furthermore, distributions of any of the individually listed compounds of Formula I can be used.

Throughout, when referring to the distributions (m, n, and p), the words "average value of p," for example, may be used interchangeably with the words "average value for p," "number average p," and the symbols "$P_{avg}$" and $p_{av}$."

In another embodiment $R_f^1$ includes mono- and difunctional perfluoroalkyl and perfluoroalkylene groups of the respective formulas $C_nF_{2n+1}-$ and $-C_nF_{2n}-$, where n is 3 to 20, preferably 4 to 10. Such groups may be linear or branched, or a mixture thereof.

Suitable linking groups, Q, include difunctional or trifunctional organic linking groups optionally containing heteroatoms (such as sulfur, oxygen, nitrogen, and the like, for examples) and/or functional groups (such as amides, esters, sulfonamides, carbonates, and the like, for examples).

Examples of Q groups include, but are not limited to, difunctional groups: $-C(O)NH(C_kH_{2k})-$, $-SO_2NR(C_kH_{2k})-$, $-CH_2O(C_kH_{2k})-$, $-C_kH_{2k}-$, $-C(O)S(C_kH_{2k})-$, $-CH_2OC(O)N(R)(C_kH_{2k})-$, wherein R is hydrogen or a $C_1$–$C_4$ alkyl group, and k is 2 to 25; and the trifunctional group:

Preferred linking groups (Q) are $-C(O)NH(CH_2)_3-$, $-CH_2O(CH_2)_3-$, and $-CH_2OC(O)N(R)(CH_2)_3-$, when $R_f^1$ is a perfluoropolyether. Other preferred linking groups (Q) are $-SO_2NR(C_kH_{2k})-$, $-C_kH_{2k}-$ where k is greater than or equal to 2, and $-CH_2O(CH_2)_3-$, when $R_f^1$ is a perfluoroalkyl or perfluoroalkylene.

Y independently represents a $C_1$–$C_4$ alkoxy group or a hydrophilic alkoxy group, with the proviso that at least one hydrophilic alkoxy group is present. The hydrophilic alkoxy group may have the general formula:

$$(O-A-R^3) \qquad (II)$$

wherein A is independently a difunctional hydrophilic group (a) having the formula:

$$(CHR^2-CH_2O)_q \qquad (III)$$

in which q is a number having a value of 1 to 40, preferably 2 to 10, $R^2$ is independently hydrogen or methyl, and that at least 70% of $R^2$ is hydrogen; or (b) derived from a polyol or its alkyl ether or polyether derivative by removal of one OH and one hydroxyl hydrogen, preferably derived from sorbitol or glycerol. $R^3$ independently is hydrogen or lower alkyl group having 1 to 4 carbon atoms. Preferred hydrophilic alkoxy groups are those derived from polyoxyethylene alcohols.

Polyoxyethylene alcohols preferred in this invention have a molecular weight up to about 1500 grams per mole (g/mole). Many are commercially available and are sold under the trademarks CARBOWAX™ and CELLOSOLVE™ (available from Aldrich Chemical Co., Milwaukee, Wis.). Preferred polyoxyalkylene alcohols include ethyleneglycols and their monomethyl or monoethylethers, such as diethyleneglycolmonomethylether, triethyleneglycolmonomethylether, and heptaethyleneglycol monomethyl ether.

$R^1$ independently represents a $C_1$–$C_4$ alkyl group. Representative examples of alkyl groups that are preferred include methyl and ethyl groups.

Self-emulsifying fluorinated alkoxysilanes of Formula I generally have a molecular weight (number average) of at least about 300 grams per mole (g/mole), and preferably, at least about 500 g/mole, and more preferably between about 1000 g/mole and 3000 g/mole.

With respect to Formula I, a preferred group of self-emulsifying fluorinated alkoxysilanes includes those:

where $R_f^1$ is:

(a) $-CF(CF_3)(OCF_2CF(CF_3))_mO(C_nF_{2n})O(CF(CF_3)CF_2O)_pCF(CF_3)-$, wherein average values of m and p are from 1 to 20, m+p≦20, more preferably m+p=about 4 to about 12, and n ranges from 1 to 4; or (b) $-CF_2O(CF_2O)_m(CF_2CF_2O)_pCF_2-$, and the average value of m+p=16 to 24;

(c) $C_3F_7O(CF(CF_3)CF_2O)_pCF(CF_3)-$, wherein the average value of p=4 to 15;

(d) $CF_3O(CF_2CF_2O)_pCF_2-$, wherein the average value of p=5 to 20; or (e) $CF_3CF_2CF_2O(CF_2CF_2CF_2O)_n-$, wherein $n_{avg}=1$ to 20.

Q is independently an organic difunctional or trifunctional linking group, optionally containing a heteroatom or a functional group;

$R^1$ is independently a $C_1$–$C_4$ alkyl group;

Y is independently a $C_1$–$C_4$ alkoxy group or a hydrophilic alkoxy group derived from a polyethyleneglycol monoalkyl ether, with the proviso that at least one hydrophilic alkoxy group is present;

x is 0 or 1;

y is 1 or 2; and z is 1 or 2.

Where $R_f^1$ is a perfluoroalkyl or perfluoroalkylene group, $R_f^1$ can include linear, branched, or cyclic structures, that may be saturated or unsaturated. $R_f^1$ may be represented by the formulae —$C_{k'}F_{2k'+1}$ for a perfluoroalkyl group, or by —$C_{k'}F_{2k'}$— for a perfluoroalkylene group, wherein k' is about 3 to about 20, more preferably, about 6 to about 12, and most preferably, about 7 to about 10. With reference to Formula I, the difunctional or trifunctional Q group can include linear, branched, or cyclic structures, that may be saturated or unsaturated.

Typically, suitable self-emulsifying fluorinated alkoxysilanes include a mixture of isomers (e.g., a mixture of compounds containing linear and branched perfluoroalkyl groups). Mixtures of self-emulsifying fluorinated alkoxysilanes exhibiting different values of k' can also be used.

Examples of preferred fluorinated perfluoroalkoxysilanes include, but are not limited to, the following:

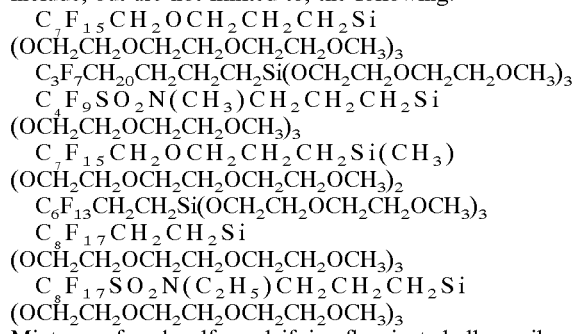

Mixtures of such self-emulsifying fluorinated alkoxysilanes can also be used if desired.

The self-emulsifying alkoxysilanes of Formula I can be synthesized using standard techniques. For example, commercially available or readily synthesized perfluoropolyether esters can be combined with a functionalized alkoxysilane, such as a 3-aminopropyltrialkoxysilane, according to methods taught in U.S. Pat. No. 3,810,874 (Mitsch et al.) and U.S. Pat. No. 3,646,085 (Bartlett), which are incorporated herein by reference. Self-emulsifying fluorinated alkoxysilanes bearing hydrophilic alkoxy groups can also be prepared by alcohol exchange between a trialkoxysilane, such as a trimethoxy- or -ethoxysilane, and an alcohol, such as triethylene glycol monomethyl ether, as taught in U.S. Pat. No. 5,274,159 (Pellerite et al.), which is also incorporated herein by reference. Modifications of these methods are described in the Examples. Such materials may or may not need to be purified before use in a dilutable, non-aqueous concentrate.

The self-emulsifying fluorinated alkoxysilane is generally included in the dilutable, non-aqueous concentrate in an amount between about 10 wt % and about 80 wt % of the dilutable, non-aqueous concentrate, preferably between about 20 wt % and about 75 wt %, and most preferably between about 25 wt % and about 50 wt %.

Orizanic Cosolvent

The dilutable, non-aqueous concentrate of the present invention may include one or more organic cosolvents. An organic cosolvent is an organic liquid component that renders the surfactant(s) (if present) and the self-emulsifying fluorinated alkoxysilane(s) compatible (when they are not compatible in the absence of the organic cosolvent), and/or may be used to lower the viscosity of the dilutable, non-aqueous concentrate.

Suitable organic cosolvents are completely miscible in water, i.e., a continuous homogenous single phase solution is obtained at room temperature (20–30° C.). Suitable organic solvents may be organic solvents, or mixtures of organic solvents, that include, but are not limited to, aliphatic alcohols, such as methanol, ethanol, and isopropyl alcohol; ketones such as acetone; esters, such as ethyl (S)-(-)-lactate and di(ethylene glycol) ethyl ether acetate; ethers, such as 1,4-dioxane and diethylene glycol dimethyl ether; and amides, such as N-methylpyrrolidinone and N,N-dimethylformamide. Certain fluorinated organic solvents, such as trifluoroethanol, may be used alone or in combination with non-fluorinated organic cosolvents.

Preferred organic cosolvents are aliphatic alcohols. Some examples of preferred aliphatic alcohols are ethanol, methanol, isopropyl alcohol, and polyethyleneglycols. Especially preferred are di- and triethyleneglycol monomethyl and monoethyl ethers.

Preferably, the organic cosolvent has a boiling point that is below 200° C.

The organic cosolvent may be included, if used, in the dilutable, non-aqueous concentrate in an amount up to about 75 wt % of the dilutable, non-aqueous concentrate, and preferably up to about 50 wt %.

Fluorinated Surfactant

The self-emulsifying fluorinated alkoxysilanes intended for use in this invention are water-soluble or self-emulsifying due to the presence of the hydrophilic alkoxy group(s). This means that the self-emulsifying fluorinated alkoxysilanes can be diluted into either water or an aqueous solvent mixture without an added emulsifier. While not required in this invention, in some cases addition of a fluorinated surfactant to the dilutable, non-aqueous concentrate can extend the useful life of the aqueous dilution that results from dilution with either water or an aqueous solvent mixture. For example, without the presence of a fluorinated surfactant, the self-emulsifying fluorinated alkoxysilane(s) may be stable once diluted with a diluting medium containing water for about minutes, while with the presence of a fluorinated surfactant the self-emulsifying fluorinated alkoxysilane(s) may be stable for about hours.

A surfactant is defined as "a substance that, when present at low concentration in a system, has the property of adsorbing onto the surfaces or interfaces of the system and of altering to a marked degree the surface or interfacial free energies of these surfaces." (Milton J. Rosen, "Surfactants and Interfacial Phenomena," Second Ed., John Wiley & Sons, New York, N.Y., 1989, page 1). These surfactants have "a characteristic molecular structure consisting of a structural group that has very little attraction for [a] solvent, known as a lyophobic group, together with a group that has a strong attraction for [a] solvent, called the lyophilic group . . . " (Milton J. Rosen, "Surfactants and Interfacial Phenomena," Second Ed., John Wiley & Sons, New York, N.Y., 1989, pages 3–4). When the solvent is aqueous, the lyophobic group is typically a nonpolar group such as alkyl or fluorinated alkyl, while the lyophilic group is a polar group.

The term "fluorinated" (as in the term fluorinated surfactant) indicates that at least about 75 percent, preferably at least about 85 percent, more preferably at least about 95 percent, of the hydrogen atoms of the alkyl moiety are replaced by fluorine atoms. Optionally, remaining hydrogen atoms can be replaced by other halogen atoms, such as by chlorine atoms.

Fluorinated surfactants useful in this invention are amphiphilic materials, comprising one or more hydrophobic fluorochemical segments and one or more solubilizing and hydrophilic segments. Such materials are described in "Fluorinated Surfactants and Repellents", Second Edition, by E. Kissa, Surfactant Science Series, Volume 97, Marcel Dekker, Inc.: New York, 2001, pp 1–21. The fluorinated surfactants have a fluorine content by weight of at least 10%. These fluorinated surfactants can be monomeric or polymeric, with molecular weights between about 300 and about 100,000 grams per mole, preferably between about 400 and about 20,000 grams per mole. The hydrophobic fluorochemical groups can be, for instance, perfluoroalkyl containing between about 3 and about 20 carbon atoms, or a mono- or divalent perfluoropolyether group with molecular weight between about 300 and about 10,000 grams per mole. Hydrophilic groups on the fluorinated surfactants can be of anionic (such as carboxylate), cationic (such as quaternary ammonium), nonionic (such as oligo(oxyethylene) or amphoteric (such as amine oxide) nature as long as they do not contain functionalities that cause instability in the concentrates of this invention, for example strongly acidic groups, strongly basic groups, or contamination by fluoride ions.

Representative fluorinated surfactants include, but are not limited to, the following:

$C_7F_{15}CO_2^-—NH_4^+$ $C_8F_{17}SO_2N(C_2H_5)(C_2H_4O)_7CH_3$ $C_8F_{17}(C_2H_4O)_{10}H$ $(C_4F_9SO_2)_2N^-NH_4^+$ $C_4F_9SO_2N(CH_3)(C_2H_4O)_nCH_3$ (where $n_{avg}$~7)

$C_3F_7O(CF(CF_3)CF_2O)_nCF(CF_3)CO_2^-NH_4^+$ (where $n_{avg}$~13)

Examples of these and other fluorinated surfactants of the present invention are described, for example, in U.S. Pat. No. 3,772,195 (Francen), U.S. Pat. No. 4,090,967 (Falk), U.S. Pat. No. 4,099,574 (Cooper et al.), U.S. Pat. No. 4,242,516 (Mueller), U.S. Pat. No. 4,359,096 (Berger), U.S. Pat. No. 4,383,929 (Bertocchio et al.), U.S. Pat. No. 4,472,286 (Falk), U.S. Pat. No. 4,536,298 (Kamei et al.), U.S. Pat. No. 4,795,764 (Alm et al.), U.S. Pat. No. 4,983,769 (Bertocchio et al.) and U.S. Pat. No. 5,085,786 (Alm et al.), which are herein incorporated by reference. Many of these fluorinated surfactants are commercially available from Minnesota Mining and Manufacturing Company (St. Paul, Minn.), having the tradename FLUORAD™, or commercially available from E.I. DuPont de Nemours and Co. (Wilmington, Del.), having the tradename ZONYL™.

Polymeric fluorinated surfactants can also be used in the present invention. Examples of polymeric fluorinated surfactants that may be used in the present invention are found in U.S. Pat. No. 3,787,351 (Olson), U.S. Pat. No. 4,668,406 (Chang), and PCT Intl'l App. WO 01/30873, which are incorporated herein by reference.

Examples of polymeric fluorinated surfactants that may be used include random copolymer fluorinated surfactants. Examples of random copolymer fluorinated surfactants include the following structures:

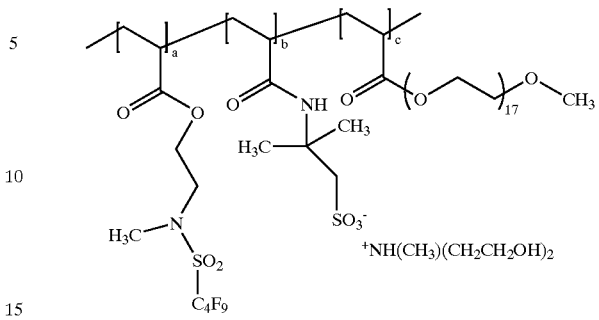

wherein the molar ratio of a:b:c is about 30:about 1:about 32, and wherein the molecular weight of the surfactant is about 1,000 to about 4,000 grams per mole; and

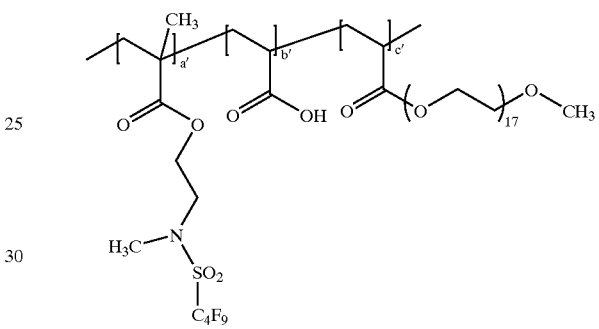

wherein the molar ratio of a':b':c' is about 3:about 3:about 1, and wherein the molecular weight of the surfactant is about 5,000 to about 40,000 grams per mole.

The fluorinated surfactant is generally included in the dilutable, non-aqueous concentrate in an amount up to about 50 wt % of the dilutable, non-aqueous concentrate, preferably up to about 30 wt %, and most preferably up to about 15 wt %.

Optional Additives

The dilutable, non-aqueous concentrate may also include one or more optional additives.

Some examples of optional additives are catalysts to assist with curing and/or crosslinking of the dilutable concentrate once it is diluted and coated on a substrate. A curing additive may be added when necessary to facilitate the cure. Such a curing additive may take the form of an acid precursor, which releases an acid upon exposure to heat, ultraviolet light, visible light, electron beam irradiation, or microwave irradiation. Acid precursors include, for instance, sulfonium and iodonium salts as well as alkyl esters of alkane- or fluoroalkanesulfonic acids, and are described in U.S. Pat. No. 6,204,350 (Liu et al.) (which is incorporated herein by reference).

Some additives, such as ammonium salts of acids such as perfluorocarboxylic acids, alkylsulfonic acids, arylsulfonic acids, perfluoroalkylsulfonic acids, and perfluoroalkylsulfonimides can function as latent or thermally activated curing additives as well as function as surfactants. Therefore, the dilutable, non-aqueous concentrate may include one of these dual-functioning surfactants and may not need a separate catalyst.

Other possible optional additives include, but are not limited to, hydrocarbon surfactants, silicone surfactants, antimicrobial agents, UV absorbers, hydrocarbon silanes, and micro- or nanoparticles of inorganic materials, such as silica or titania.

An optional additive or additives may be included in the dilutable, non-aqueous concentrate in an amount up to about 50% by weight of the dilutable, non-aqueous concentrate, more preferably up to about 5% by weight.

The dilutable, non-aqueous concentrate may be prepared by combining the components in any order in a fashion that is known in the art.

If the dilutable, non-aqueous concentrate is not immediately homogeneous after mixing the ingredients, the concentrate may become homogeneous after time has passed. In order to speed homogeneity, however, the dilutable, non-aqueous concentrate may be heated.

For ease of manufacture etc., the dilutable, non-aqueous concentrate is typically diluted with a diluting medium (or the aqueous dilution composition is typically prepared) shortly before use.

The presence of certain chemical functionalities such as strong acids (i.e. sulfonic, mineral, phosphoric, and perfluorinated acids) and species such as fluoride ion are preferably avoided in the dilutable, non-aqueous concentrate of this invention if they lead to instability of the corresponding aqueous dilution and/or the dilutable, non-aqueous concentrate itself.

Aqueous Dilution

Another embodiment of the present invention is an aqueous dilution, which comprises: a diluting medium that comprises water or an aqueous solvent mixture comprising water and an organic cosolvent (as described above); and a dilutable, non-aqueous concentrate, as described above, with the proviso that the $R_f^1$ group of the at least one fluorinated alkoxysilane comprises independently a mono- and/or difunctional perfluoropolyether comprising perfluorinated repeating units selected from the group consisting of $-(C_nF_{2n})-$, $-(C_nF_{2n}O)-$, $-(CF(Z))-$, $(CF(Z)O)-$, $-(CF(Z)C_nF_{2n}O)-$, $-(C_nF_{2n}CF(Z)O)-$, and combinations thereof. In these repeating units, Z is a fluorine atom, a perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of perfluoropolyethers containing polymeric moieties made of these repeating units are disclosed in U.S. Pat. No. 6,277,485 (Invie et al.). For the monofunctional perfluoropolyether group, the terminal groups can be $(C_nF_{2n+1})-$, $(C_nF_{2n+1}O)-$ or $(X'C_nF_{2n}O)-$, wherein X' is H, Cl, or Br, for example. Preferably, these terminal groups are perfluorinated. In these repeating units or terminal groups, n is 1 to 6, and preferably 1 to 3.

The aqueous dilution may also include optional additives (as described above). Some exemplary optional additives are described above. The optional additive(s) of the aqueous dilution may be in addition to the additive(s) in the dilutable, non-aqueous concentrate. As discussed above with regard to the dilutable, non-aqueous concentrates, additives which adversely affect the stability of the aqueous dilution are preferably avoided. These may include strongly acidic species and fluoride ions. The pH of the aqueous dilution is in the range of about 2 to about 11, and most preferably about 4 to about 8.

The aqueous dilution may be prepared by first combining the components of the dilutable, non-aqueous concentrate and then subsequently adding the dilutable, non-aqueous concentrate to the diluting medium, which is water or an aqueous solvent mixture. The aqueous dilution is preferably prepared, however, by adding the diluting medium to the dilutable, non-aqueous concentrate.

The amount of dilutable, non-aqueous concentrate that is typically in the aqueous dilution is from about 0.05 wt % to about 10 wt % of the aqueous dilution, preferably from about 0.1 wt % to about 2 wt %.

The aqueous dilution may be a clear solution as well as a somewhat hazy solution.

An optional additive or additives to the aqueous dilution may be added after the dilutable, non-aqueous concentrate has been diluted. One preferred optional additive is a curing additive, as discussed above, that may be added to the aqueous dilution in an amount up to about 3 wt % of the aqueous dilution.

The aqueous dilution is generally applied to a substrate in an amount sufficient to produce a coating that is water and oil repellent. This coating can be extremely thin, e.g., 1 to 2 nanometers in thickness, though in practice a coating may be thicker, e.g., up to about 50 nanometers in thickness.

The aqueous dilution of the present invention advantageously spreads well on a substrate to achieve uniform properties over the whole surface. In addition, the aqueous dilutions minimize or eliminate the use of volatile organic compounds (VOCs), thereby reducing pollution and exposure to potentially harmful, and often flammable, solvent vapors.

Method

The present invention also provides a method for treating a substrate, comprising the step of applying the aqueous dilution of the invention, as discussed above, to a substrate to form a treated substrate.

Suitable substrates that can be treated in a particularly effective way with the aqueous dilution of this invention include substrates having a hard surface preferably with functional groups, such as —OH groups that occur on siliceous substrates, capable of reacting with the silane. Preferably, such reactivity of the surface of the substrate is provided by functional groups having active hydrogen atoms, such as —OH. When such active hydrogen atoms are not present, the substrate may first be treated in a plasma containing oxygen or in a corona atmosphere to make it reactive to the fluorinated alkoxysilane.

Treatment of substrates renders the treated surfaces less retentive for soils and more readily cleanable due to the oil and water repellent nature of the treated surfaces. These desirable properties are maintained despite extended exposure or use and repeated cleanings because of the high degree of durability of the treated surface.

Preferably, the substrate is cleaned prior to applying the aqueous dilution of the present invention so as to obtain optimum characteristics, particularly durability. That is, the surface of the substrate to be coated preferably is substantially free of organic contamination prior to coating. Cleaning techniques depend on the type of substrate and include, for example, a solvent washing step with an organic solvent, such as acetone or ethanol, or exposure to a reactive gas-phase treatment such as air plasma or UV/ozone.

Useful substrates include, but are not limited to, textiles, apparel, leather, paper, cardboard, carpet, ceramics, glazed ceramics, porcelain, flat glass, hollow glass, metals (such as aluminum, iron, stainless steel, copper and the like), metal oxides, natural and man-made stone, thermoplastic materials (such as poly(meth)acrylate, polycarbonate, vinyl, polystyrene, styrene copolymers such as styrene/acrylonitrile copolymers, and polyesters such as polyethylene terephthalate), paints (such as those based on acrylic resins), powder coatings (such as polyurethane, epoxy or hybrid powder coatings), and wood.

Preferred substrates include metals and siliceous substrates including ceramics, glazed ceramics, glass, concrete, mortar, grout and natural and man-made stone. Particularly preferred substrates include glazed ceramics and glass. Various articles, having at least one substrate, can be effectively treated with the inventive aqueous dilution to provide a water and oil repellent coating thereon. Examples include glazed ceramic tiles, enameled bathtubs or toilets, glass shower panels, construction glass, various parts of a vehicle (such as the mirror or windscreen), and glazed ceramic or enamel pottery materials.

Another particularly preferred substrate is a substrate having an antireflective (AR) film on it. Antireflective (AR) films prepared by vacuum sputtering of metal oxide thin films on substrates made of glass or plastic are particularly useful in display devices of electronic equipment. Such metal oxide films are relatively porous and consist of clusters of particles forming a relatively rough profile. AR films help reduce glare and reflection. When the AR films are conductive, they also help reduce static discharge and electromagnetic emissions. Thus, a primary application for AR films is to provide contrast enhancement and antireflective properties to improve the readability of display devices, such as computer monitors. AR films are described in U.S. Pat. No. 5,851,674 (Pellerite et al.), which is incorporated herein by reference.

Sputtered metal oxide antireflective films are generally durable and uniform. Also, their optical properties are controllable, which makes them very desirable. They also have very high surface energies and refractive indices. However, the high surface energy of a sputtered metal oxide surface makes it prone to contamination by organic impurities (such as skin oils). The presence of surface contaminants results in a major degradation of antireflectivity properties of the metal oxide coatings. Furthermore, because of the high refractive indices, surface contamination becomes extremely noticeable to the end-user. The present inventive method allows for a protective coating on an antireflective film that is relatively durable, and more resistant to contamination and easier to clean than the antireflective film itself.

Preferably, the overall coating thickness of the dried coating of the aqueous dilution on an antireflective film is greater than a monolayer (which is typically greater than about 1.5 nanometers (nm) thick). That is, preferably, a coating from the aqueous dilution is at least about 2.0 nm thick for antisoiling purposes on antireflective articles, and more preferably, at least about 3.0 nm thick. Preferably, it is less than about 10.0 nm thick, and more preferably, less than about 5.0 nm thick. The coating from the aqueous dilution is typically present in an amount that does not substantially change the antireflective characteristics of the antireflective film.

Methods for applying the aqueous dilution to a substrate include, but are not limited to, spray, spin, dip, flow, and roll coat methods, etc. A preferred coating method for application of the aqueous dilution includes spray application. Spraying may be effected by passing the pressurized aqueous dilution though a suitable jet, nozzle or orifice onto the substrate surface in the form of a stream or atomized mist.

A substrate to be coated can typically be contacted with the aqueous dilution at room temperature (typically about 20° C. to about 25° C.). Alternatively, the aqueous dilution can be applied to a substrate that is preheated at a temperature of, for example, between 60° C. and 150° C. This is of particular interest for industrial production, where e.g., ceramic tiles can be treated immediately after the firing oven at the end of the production line. Following application, the treated substrate must be dried and cured at an elevated temperature for a time sufficient to dry or cure.

The obtained coating on the substrate may be cured, generally at an elevated temperature of about 40 to about 300° C., although elevated temperatures may not be required. The heat for curing can be supplied either through an initial preheat of substrates having sufficient heat capacity to provide the heat for curing, or through heating of coated substrates by an external heat source subsequent to coating.

Article

Another embodiment of the present invention is an article comprising: (a) a substrate (as described above); and, (b) a coating on said substrate obtained by applying the aqueous dilution (as described above) onto said substrate and drying said aqueous dilution.

EXAMPLES

The invention is further illustrated by the following Examples, but the particular materials and amounts thereof recited in these Examples, as well as other conditions and details, should not be construed to unduly limit this invention.

TABLE 1

Table of Materials.

| Material | Structure (and/or chemical name) | Availability |
| --- | --- | --- |
| Acetic acid | $CH_3CO_2H$ | Sigma-Aldrich, Milwaukee, WI |
| DOWANOL ™ DM | Di(ethyleneglycol) methyl ether; $CH_3OCH_2CH_2OCH_2CH_2OH$ | Sigma-Aldrich |
| Emulsifier 218 | Fluorinated polymeric surfactant | As prepared in WO 01/30873A1, Example 16 (which is incorporated herein by reference). |
| Ethanol | $C_2H_5OH$ | Sigma-Aldrich |
| FOMBLIN Z-DEAL ™ | $CH_3OC(O)CF_2(CF_2O)_n(CF_2CF_2O)_mCF_2C(O)OCH_3$; where $n_{avg}$, $m_{avg}$ = ~10 – 12 | Ausimont, Thorofare, NJ |
| MPEG 350 | CARBOWAX ™ Methoxypoly(ethyleneglycol) 350 | Union Carbide, Danbury, CT |

TABLE 1-continued

Table of Materials.

| Material | Structure (and/or chemical name) | Availability |
|---|---|---|
| PFPE Disilane | $XCF_2O(CF_2O)_m(C_2F_4O)_nCF_2X$<br>Where $X = CONH(CH_2)_3Si(OCH_3)_3$<br>$m_{avg}, n_{avg}$ ~10 – 12 | Prepared as described in U.S. 3,810,874 (which is incorporated herein by reference). |
| TEG | Tri(ethylene glycol) monomethyl ether;<br>$CH_3OCH_2CH_2OCH_2CH_2OCH_2CH_2OH$ | Sigma-Aldrich |
| TRITON 198 X-405 | Ethoxylated octylphenol | Rohm & Haas, France |
| Toluene | $C_6H_5CH_3$ | Sigma-Aldrich |
| HFPO (4.5) silane | $CF_3CF_2CF_2O$ $[CF(CF_3)CF_2O]_n$ – $CF(CF_3)$<br>$C(O)NH$ $(CH_2)_3$ $Si$ $(OCH_3)_3$ $n_{avg}$~4.5 | Prepared as described in U.S. Pat. No. 3,646,085 (and incorporated herein by reference) |
| HFPO (9.0) silane | $CF_3CF_2CF_2O$ $[CF(CF_3)CF_2O]_n$ – $CF(CF_3)$<br>$C(O)NH$ $(CH_2)_3$ $Si$ $(OCH_3)_3$ $n_{avg}$~9.0 | Prepared as described in U.S. Pat. No. 3,646,085 (and incorporated herein by reference) |
| HFPO (4.5) methyl ester | $CF_3CF_2CF_2O$ $[CF(CF_3)CF_2O]_n$ – $CF(CF_3)$<br>$C(O)OCH_3$ $n_{avg}$~4.5 | Prepared as described in U.S. Pat. No. 3,646,085 (and incorporated herein by reference) |

Test Methods

Abrasion/Scrub Test

Abrasion testing was accomplished using an Erichsen cleaning machine (available from DCI, Belgium), 3M™ HIGH PERFORMANCE™ Cloth (available from Minnesota Mining and Manufacturing Co., (3M), St. Paul, Minn.) and CIF™ cream cleaner (available from Lever Faberge, France), using 40 cycles.

Contact Angle Measurement

The treated substrates were tested for their contact angles versus water (W) and n-hexadecane (O) using an Olympus TGHM goniometer (Olympus Corp, Pompano Beach Fla.). The contact angles were measured before (initial) and directly after abrasion (abrasion), unless otherwise indicated. The values are the mean values of 4 measurements and are reported in degrees. The minimum measurable value for a contact angle was 20. A value <20 means that the liquid spreads on the surface.

Spray Coat Method

In a first step, the substrates were cleaned and degreased with acetone. After cleaning, fluorinated polyether silanes in solvent mixtures, as given in the respective examples, were applied onto the substrates by spray application at about 20 milliliters/minute (ml/minute). The substrates were preheated to 150° C. before coating. Coated samples were dried at room temperature or in a forced-air oven at 120° C. for 30 minutes. Afterwards, excess product was polished off using a dry paper cloth.

Preparation 1

Synthesis of $(CH_3OCH_2CH_2OCH_2CH_2OCH_2CH_2O)_3$—Si—$(CH_2)_3$ NH C(O)—$CF_2O$ $(CF_2O)_n(CF_2CF_2O)_mCF_2C(O)NH(CH_2)_3Si(OCH_2CH_2OCH_2CH_2OCH_2CH_2OCH_3)_3$ (PFPE TEG); where n , m=~10–12

In a 500 milliliter (ml) three-necked flask fitted with a cooler, stirrer and thermometer, were placed PFPE disilane (24.0 grams (g); 0.01 mole), TEG (10.4 g; 0.06 mole), and 20 ml toluene under a nitrogen atmosphere, the reaction mixture was heated to 120° C., and volatile products were distilled from the reaction mixture. The flask was additionally heated for 2 hours at 140° C. and then for 1 hour at 160° C. under nitrogen. A clear, yellow brown, viscous liquid was obtained, PFPE TEG.

Preparations 2–5

Using the synthetic procedure outlined in Preparation 1, the following Examples were prepared with noted modifications:

In Preparation 2, MPEG 350 was used instead of TEG.

In Preparation 3, HFPO (4.5) silane was used instead of PFPE disilane.

In Preparation 4, HFPO (9.0) was used instead of PFPE disilane, and di(ethyleneglycol) monomethyl ether was used in place of TEG.

In Preparation 5, HFPO (9.0) silane was used instead of PFPE disilane.

Preparation 6

In a 500 ml three-necked flask fitted with a stirrer, condenser and thermometer, were placed aminopropyltrimethoxysilane (19.7 g; 0.1 mole, available from Sigma Aldrich), TEG (52.2 g; 0.3 mole) and 20 g toluene. The reaction mixture was heated at 120° C. for 2 hours under nitrogen, distilling off the toluene, followed by 2 hours at 140° C. and 1 hour at 160° C.; a yellow-brown product, $NH_2CH_2CH_2CH_2Si(OCH_2CH_2OCH_2CH_2OCH_2CH_2OCH_3)_3$, was obtained.

To this mixture, 98.8 g (about 0.05 mole) FOMBLIN Z-DEAL™ was added under nitrogen; the reaction was continued for 4 hours at 60° C.; a viscous, yellow-brown reaction product: $XC(O)CF_2(CF_2O)_n(CF_2CF_2O)_mCF_2C(O)X$; where $X = NHCH_2CH_2CH_2Si(OCH_2CH_2OCH_2CH_2OCH_2CH_2OCH_3)_3$ and n, m=~10–12 was obtained.

Preparation 7

The same synthetic procedure as in Preparation 6 was used, but with HFPO (4.5) methyl ester instead of FOMBLIN Z-DEAL™.

Preparation 8

Perfluorooctylethyltris[2-(2-methoxyethoxy)ethoxy] silane was prepared according to U.S. Pat. No. 5,550,184 (Halling et al.), Example 1 (which is incorporated herein by reference), using perfluorooctylethyltrichlorosilane (available from ABCR, Germany) as the perfluoroalkylethyltrichlorosilane.

Examples 1–8

In Examples 1–7, Preparations 1–7 were dissolved in absolute ethanol by adding 3 g of the Preparation in 7 g of absolute ethanol. Clear concentrates were obtained, which were stable for at least 1 month. In Example 8, 3 g of Preparation 1 was dissolved in 7 g of TEG; again a clear and stable concentrate resulted, which remained clear for over 1 month.

Comparative Example C1

A mixture of 0.1 g PFPE disilane, 1.5 g acetic acid, 3 g DI water and 95.4 g ethanol was prepared by mixing at room temperature.

Examples 9–15

Concentrates from Examples 1–7 (0.33 g) were diluted with 99.67 g portions of a mixture of 5 parts by weight TEG, 1 part acetic acid, and 94 parts deionized water. These formulations were spray coated onto hot, white, glazed tiles from Villeroy & Boch (Mattlach, Germany) at 150° C. and polished 1 minute after application using paper wipes. Contact angles were measured with a TGHM-goniometer with water and hexadecane. Abrasion resistance was measured after 40 cycles on the Erichsen cleaning machine with CIF™ cream cleaner. Results are listed in Table 2.

Example 16

Material for Example 16 was prepared as described in Examples 9–15 above with the exception that 0.26 g clear concentrate containing PFPE-TEG (Preparation 1; 37.5%), Emulsifier 218 (12.5%) and ethanol (50%) was diluted into a solution containing acetic acid (1.5 g) and DI water (98.2 g). The aqueous dilution was stable for 48 hours. The ensuing clear solution was spray coated onto ceramic sanitary tiles (SPHINX™; available from Trega International, Maastricht, Netherlands). Contact angle results are listed in Table 2.

Example 17

Concentrate from Example 8 (0.33 g) was added to a mixture of DI water (93.4 g) and acetic acid (1.5 g) and mixed at room temperature. The ensuing clear solution, which was stable for about one to two hours, was spray coated onto ceramic tiles (SPHINX™, available from Trega International, Maastricht, Netherlands). Contact angles are listed in Table 2.

Comparative Example C2

Comparative Example C2 was prepared according to U.S. Pat. No. 5,550,184 (Halling et al.) (which is incorporated herein by reference) using Preparation 8 as the source of silane and TRITON™ X-405 instead of nonylphenol-50 EO. This formulation was spray coated onto hot, white glazed tiles from Villeroy & Boch at 150° C. and polished 1 minute after application with a paper wipe. Contact angles were measure with a TGHM goniometer with water and hexadecane. Abrasion resistance was measured after 40 cycles on the Erichsen cleaning machine with CIF™ cream cleaner. Results are listed in Table 2.

TABLE 2

| Example | Preparation | Contact angles (°) with water-hexadecane | |
|---|---|---|---|
| | | Initial | After abrasion |
| 9 | 1 | 107–67 | 75–45 |
| 10 | 2 | 103–63 | 64–39 |
| 11 | 3 | 106–64 | 70–45 |
| 12 | 4 | 99–62 | 72–40 |
| 13 | 5 | 104–63 | 75–42 |
| 14 | 6 | 112–69 | 80–50 |
| 15 | 7 | 106–64 | 72–43 |
| 16 | 1 | 108–64 | 69–40 |
| 17 | 1 | 106–63 | 75–43 |
| C1 | PFPE disilane | 108–65 | 85–53 |
| C2 | 8 | 94–58 | 45–30 |

What is claimed is:

1. A dilutable, non-aqueous concentrate, comprising a homogeneous mixture comprising:
   (a) at least one self-emulsifying fluorinated alkoxysilane of the formula I:

$$R_f^1-[-Q-[SiY_{3-x}R^1_x]_z]_y \qquad (I)$$

wherein $R_f^1$ represents a monofunctional or difunctional fluorinated group;
   Q independently represents an organic difunctional or trifunctional linking group;
   $R^1$ independently represents a $C_1$–$C_4$ alkyl group;
   Y independently represents a $C_1$–$C_4$ alkoxy group or a hydrophilic alkoxy group of the structure —O-A-$R^3$ with the proviso that at least one hydrophilic alkoxy group is present in the fluorinated alkoxysilane, wherein each A independently comprises a difunctional hydrophilic group: a) having the formula (CHR$^2$—CH$_2$O)$_q$ in which q is a number having a value of 1 to 40, $R^2$ is independently hydrogen or methyl, and that at least 70% of $R^2$ is hydrogen; or (b) derived from a polyol or its alkyl ether or polyether derivative by removal of one OH and one hydroxyl hydrogen;
   and wherein $R^3$ independently is hydrogen or a lower alkyl group having 1 to 4 carbon atoms;
   x is 0 or 1;
   y is 1 or 2;
   z is 1 or 2; and
   (b) one or both of at least one organic cosolvent, which is completely miscible in water, and at least one fluorinated surfactant.

2. The dilutable, non-aqueous concentrate of claim 1 wherein $R_f^1$ represents a monofunctional perfluoropolyether comprising: terminal groups selected from the group consisting of $(C_nF_{2n+1})$—, $(C_nF_{2n+1}O)$— or $(X'C_nF_{2n}O)$—, wherein X' is H, Cl, or Br, and wherein n is 1 to 6; and, perfluorinated repeating units selected from the group consisting of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF(Z)O)$—, and combinations thereof, wherein Z is a fluorine atom, a perfluoroalkyl group, an oxygen-substituted perfluoroalkyl group, a perfluoroalkoxy group or an oxygen-substituted perfluoroalkoxy group, and wherein n is 1 to 6.

3. The dilutable, non-aqueous concentrate of claim 1 wherein $R_f^1$ represents a difunctional perfluoropolyether comprising perfluorinated repeating units selected from the group consisting of —$(C_nF_{2n})$—, —$(C_nF_{2n}O)$—, —$(CF(Z))$—, —$(CF(Z)O)$—, —$(CF(Z)C_nF_{2n}O)$—, —$(C_nF_{2n}CF$ (Z)O)—, and combinations thereof, wherein Z is a fluorine atom, a perfluoroalkyl group, an oxygen-substituted perfluoroalkyl group, a perfluoroalkoxy group or an oxygen-substituted perfluoroalkoxy group, and wherein n is 1 to 6.

4. The dilutable, non-aqueous concentrate of claim 1 wherein $R_f^1$ represents a monofunctional perfluoropolyether selected from the group consisting of $C_3F_7O(CF(CF_3)CF_2O)_pCF(CF_3)$— and $CF_3O(C_2F_4O)_pCF_2$— wherein an average value for p is 4 to 50.

5. The dilutable, non-aqueous concentrate of claim 1 wherein $R_f^1$ represents a difunctional perfluoropolyether selected from the group consisting of:

—$CF_2O(CF_2O)_m(C_2F_4O)_pCF_2$— and
—$CF(CF_3)(OCF_2CF\ (CF_3))_mO(C_nF_{2n})O(CF\ (CF_3)CF_2O)_pCF(CF_3)$—, wherein n is from 2 to 4;
—$CF_2O(C_2F_4O)_pCF_2$— and —$(CF_2)_3O(C_4F_8O)_p(CF_2)_3$—, wherein average values for m and p are 0 to 50, with the proviso that m and p are not simultaneously zero.

6. The dilutable, non-aqueous concentrate of claim 1 wherein $R_f^1$ is a monofunctional or difunctional perfluoroalkyl group or perfluoroalkylene group of the respective formulas $C_nF_{2n+1}$— and —$C_nF_{2n}$—, wherein n is 3 to 20.

7. The dilutable, non-aqueous concentrate of claim 1 wherein $R_f^1$ is

—$CF(CF_3)(OCF_2CF(CF_3))_m(C_nF_{2n})O(CF(CF_3)CF_2O)_pCF(CF_3)$—, wherein the average values of m and p are from 1 to 20, m+p≦20, and n is from 2 to 4.

8. The dilutable, non-aqueous concentrate of claim 1 wherein $R_f^1$ is

—$CF_2O(CF_2O)_m(CF_2CF_2O)_pCF_2$—, and wherein the average value of m+p is from 16 to 24.

9. The dilutable, non-aqueous concentrate of claim 1 wherein $R_f^1$ is $C_3F_7O(CF(CF_3)CF_2O)_pCF\ (CF_3)$—, and wherein the average value of p is from 4 to 15.

10. The dilutable, non-aqueous concentrate of claim 1 wherein $R_f^1$ is $CF_3O(CF_2CF_2O)_pCF_2$—, and wherein the average value of p=5 to 20.

11. The dilutable, non-aqueous concentrate of claim 1 wherein $R_f^1$ is $CF_3CF_2CF_2O\ (CF_2CF_2CF2O)_n$—, wherein $n_{avg}$=1 to 20.

12. The dilutable, non-aqueous concentrate of claim 1 wherein said at least one fluorinated alkoxysilane comprises:

[CH$_3$O(CH$_2$CH$_2$O)$_3$]$_3$Si(CH$_2$)$_3$NHCOCF$_2$O(CF$_2$O)$_m$(C$_2$F$_4$O)$_n$CF$_2$CONH(CH$_2$)$_3$Si[(OCH$_2$CH$_2$)$_3$OCH$_3$]$_3$ wherein the average value of m is about 10 to about 12 and the average value of n is about 10 to about 12.

13. The dilutable, non-aqueous concentrate of claim 1 wherein said at least one fluorinated alkoxysilane comprises:

[CH$_3$O(CH$_2$CH$_2$O)$_q$]$_3$Si(CH$_2$)$_3$NHCOCF$_2$O(CF$_2$O)$_m$(C$_2$F$_4$O)$_n$CF$_2$CONH(CH$_2$)$_3$Si[(OCH$_2$CH$_2$)$_q$OCH$_3$]$_3$ wherein the average value of m is about 10 to about 12, the average value of n is about 10 to about 12 and the average value of q is about 7 to about 8.

14. The dilutable, non-aqueous concentrate of claim 1 wherein said at least one fluorinated surfactant comprises:

$C_4F_9SO_2N(CH_3)(C_2H_4O)_nCH_3$, and wherein $n_{avg}$ is about 7.

15. The dilutable, non-aqueous concentrate of claim 1 wherein said at least one fluorinated surfactant comprises:

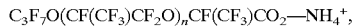

wherein $n_{avg}$ is about 13.

16. The dilutable, non-aqueous concentrate of claim 1 wherein said at least one fluorinated surfactant is a polymeric fluorinated surfactant.

17. The dilutable, non-aqueous concentrate of claim 1 wherein said at least one fluorinated surfactant is a random copolymer fluorinated surfactant.

18. The dilutable, non-aqueous concentrate of claim 17 wherein said random copolymer fluorinated surfactant comprises:

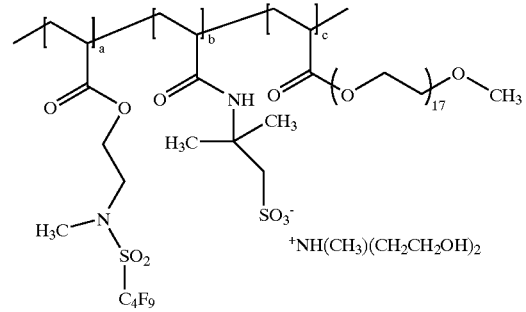

wherein the molar ratio of a:b:c is about 30:about 1:about 32, and wherein the random copolymer fluorinated surfactant has a molecular weight of about 1,000 to about 4,000 grams per mole.

19. The dilutable, non-aqueous concentrate of claim 17 wherein said random copolymer fluorinated surfactant comprises:

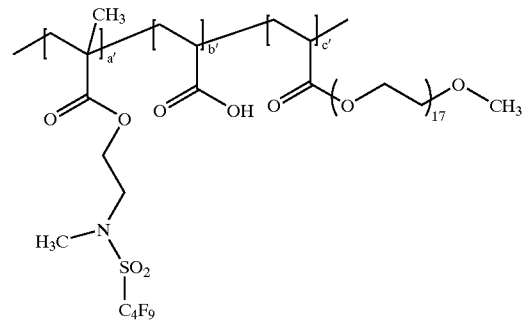

wherein the molar ratio of a':b':c' is about 3:about 3:about 1, and wherein the random copolymer fluorinated surfactant has a molecular weight of about 5,000 to about 40,000 grams per mole.

20. The dilutable, non-aqueous concentrate of claim 1 and further comprising at least one additive.

21. An aqueous dilution comprising:
a. a diluting medium comprising water or an aqueous solvent mixture, comprising water and at least one organic cosolvent, which is completely miscible in water; and
b. a dilutable, non-aqueous concentrate comprising a homogeneous mixture comprising:
   i. at least one self-emulsifying fluorinated alkoxysilane of the formula I:

$R_f^1$-[-Q-[SiY$_{3-x}$R$^1_x$]$_z$]$_y$     (I)

wherein $R_f^1$ represents a monofunctional or difunctional perfluoropolyether comprising perfluorinated repeating units selected from the group consisting of —($C_nF_{2n}$)—, —($C_nF_{2n}$O)—, —(CF(Z))—, —(CF(Z)O)—, —(CF(Z)$C_nF_{2n}$O)—, —($C_nF_{2n}$CF(Z)O)—, and combinations thereof, wherein Z is selected from the group consisting of a fluorine atom, a perfluoroalkyl group, an oxygen-substituted perfluoroalkyl group, a perfluoroalkoxy group, and an oxygen-substituted perfluoroalkoxy group, and wherein n is 1 to 6;

Q independently represents an organic difunctional or trifunctional linking group;

$R^1$ independently represents a $C_1$–$C_4$ alkyl group;

Y independently represents a $C_1$–$C_4$ alkoxy group or a hydrophilic alkoxy group of the structure —O-A-$R^3$ with the proviso that at least one hydrophilic alkoxy group is present in the fluorinated alkoxysilane, wherein each A independently comprises a difunctional hydrophilic group: a) having the formula (CHR$_2$—CH$_2$O)$_q$ in which q is a number having a value of 1 to 40, $R^2$ is independently hydrogen or methyl, and that at least 70% of $R^2$ is hydrogen; or (b) derived from a polyol or its alkyl ether or polyether derivative by removal of one OH and one hydroxyl hydrogen;

and wherein $R^3$ independently is hydrogen or a lower alkyl group having 1 to 4 carbon atoms;

x is 0 or 1;

y is 1 or 2;

z is 1 or 2; and ii. one or both of at least one organic cosolvent, which is completely miscible in water, and at least one fluorinated surfactant.

22. The aqueous dilution of claim 21 wherein said dilutable, non-aqueous concentrate further comprises at least one additive.

23. A method for treating a substrate comprising the steps of applying an aqueous dilution according to claim 21 to said substrate, and curing said aqueous dilution.

24. An article comprising:

a. a substrate; and, b. a coating on said substrate obtained by applying the aqueous dilution according to claim 21 onto said substrate and curing said aqueous dilution.

25. The article of claim 24 wherein the substrate comprises glass.

26. The article of claim 24 wherein the substrate comprises ceramic.

27. The article of claim 24 wherein the substrate comprises an antireflective film.

* * * * *

UNITED STATES PATENT AND TRADEMARK OFFICE
CERTIFICATE OF CORRECTION

PATENT NO. : 6,861,149 B2
DATED : March 1, 2005
INVENTOR(S) : Pellerite, Mark J.

It is certified that error appears in the above-identified patent and that said Letters Patent is hereby corrected as shown below:

Title page,
Item [56], References Cited, U.S. PATENT DOCUMENTS, "3,646,085" reference, delete "Barlett" and insert -- Bartlett --, therefore;

Column 1,
Line 8, insert -- now --, before "abandoned";

Column 4,
Line 20, delete "Self-Emulsifyine" and insert -- Self-Emulsifying --, therefore;

Column 6,
Lines 4-5, delete " $-CH_2OCH_2CHCH_2OC(O)NH(CH_2)_3-$ / $OC(O)NH(CH_2)_3-$ " and insert
-- $-CH_2OCH_2CHCH_2OC(O)NH(CH_2)_3-$ / $OC(O)NH(CH_2)_3-$ --, therefore;

Column 7,
Line 30, delete "$C_3F_7CH_{20}$" and insert -- $C_3F_7CH_2O$ --, therefore;
Line 65, delete "Orizanic" and insert -- Organic --, therefore;

Column 19,
Line 45, delete "$CF_3CF_2CF_2O(CF_2CF_2CF2O)_n-$" and insert
-- $CF_3CF_2CF_2O(CF_2CF_2CF_2O)_n-$ --, therefore;

UNITED STATES PATENT AND TRADEMARK OFFICE
CERTIFICATE OF CORRECTION

PATENT NO. : 6,861,149 B2
DATED : March 1, 2005
INVENTOR(S) : Pellerite, Mark J.

It is certified that error appears in the above-identified patent and that said Letters Patent is hereby corrected as shown below:

<u>Column 21</u>,
Lines 19-20, delete "$(CHR_2\text{-}CH_2O)_q$ -" and insert -- $(CHR^2\text{-}CH_2O)_q$ --, therefore.

Signed and Sealed this

Eleventh Day of October, 2005

JON W. DUDAS
*Director of the United States Patent and Trademark Office*